United States Patent [19]

Koetje

[11] Patent Number: 4,845,877
[45] Date of Patent: Jul. 11, 1989

[54] LINE CONNECTOR

[76] Inventor: John R. Koetje, 1314 McLean Rd., Mt. Vernon, Wash. 98273

[21] Appl. No.: 113,925

[22] Filed: Oct. 27, 1987

[51] Int. Cl.$^4$ .......................................... A01K 75/04
[52] U.S. Cl. .......................................... 43/7; 43/14
[58] Field of Search .................. 43/7, 9, 43.14, 43.1, 43/44.87, 44.9, 44.91, 14

[56] References Cited

U.S. PATENT DOCUMENTS

| | | | |
|---|---|---|---|
| 11,717 | 2/1899 | Pearson | 43/9 |
| 83,493 | 10/1868 | Harper . | |
| 865,531 | 9/1907 | Robinson . | |
| 1,272,272 | 7/1918 | Kell . | |
| 2,100,088 | 11/1937 | Robertson . | |
| 2,315,322 | 3/1943 | Fenley | 43/49 |
| 2,461,833 | 2/1949 | Mercier | 43/28 |
| 2,474,498 | 6/1949 | Schwabe | 43/49 |
| 2,603,905 | 7/1952 | Brzezinski | 43/11 |
| 2,753,652 | 7/1956 | Romaine | 43/43.1 |
| 2,754,616 | 7/1956 | Law | 43/44.91 |
| 2,932,072 | 4/1960 | Prunchnow | 24/129 |
| 3,102,357 | 9/1963 | Luketa | 43/9 |
| 3,107,451 | 10/1963 | Sitzler et al. | 43/44.87 |
| 3,127,693 | 4/1964 | Luketa | 43/9 |
| 3,173,222 | 3/1965 | Hansen | 43/44.91 |
| 3,192,662 | 6/1965 | Hoyle | 43/44.91 |
| 3,280,498 | 10/1966 | Decker | 43/43.12 |
| 3,545,120 | 12/1970 | Takaoka | 43/44.9 |
| 3,589,052 | 6/1971 | King | 43/44.88 |
| 3,701,212 | 10/1972 | Gilliam | 43/44.87 |
| 3,967,407 | 7/1976 | Halbasch | 43/44.9 |
| 4,426,804 | 1/1984 | Hutson | 43/44.91 |
| 4,428,143 | 1/1984 | Keller | 43/44.9 |
| 4,501,564 | 2/1985 | Cairone, Sr. | 43/17.5 |
| 4,693,031 | 9/1987 | Koetje | 43/44.9 |

FOREIGN PATENT DOCUMENTS 551445 1/1958 Canada .
900714 5/1972 Canada .

Primary Examiner—Gene P. Crosby
Attorney, Agent, or Firm—Christensen, O'Connor, Johnson & Kindness

[57] ABSTRACT

A connector (10) for detachably interconnecting the intermediate portion of a first, primary line (16) and the end portions of secondary lines (24) includes two separate, identical opposing members (30) having complementary, substantially planar mating faces (32). Grooves (34) extend centrally across the mating faces (32) of the connector members (30) to cooperatively define a primary passageway (36) extending through the connector member at the interface of the two connector members to snugly receive the primary line (16) therein. A hollow post (50) extends transversely from the mating face (32) of each connector member to engage within a close fitting, aligned socket (52) formed in the opposite connector member thereby to clamp the two connector members together. The two opposing connector members (30) also have portions cooperatively defining a pair of secondary passageways (40) extending through the connector (10) at the interface of the two connector members (30). The secondary passageways (40) are composed of a first longitudinal section (44) extending alongside the primary passageway and transverse sections (46) interconnecting the longitudinal sections (44) with the outer exterior of the connector (10). The secondary passageways (40) are designed to detachably receive the end portions of connector lines (24), with the longitudinal sections (44) of the secondary passageways (40) sized larger than knots (45) formed near the ends of the connector lines (24) and the transverse sections (46) being large enough to receive the connector lines (24) but small enough to prevent passage of the knots 45 of the connector lines therethrough.

45 Claims, 2 Drawing Sheets

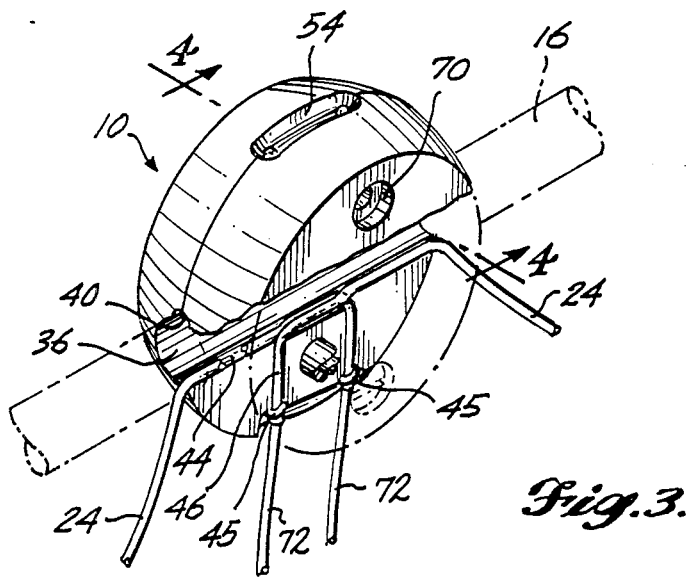
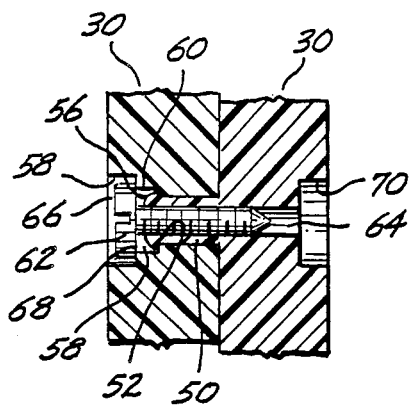
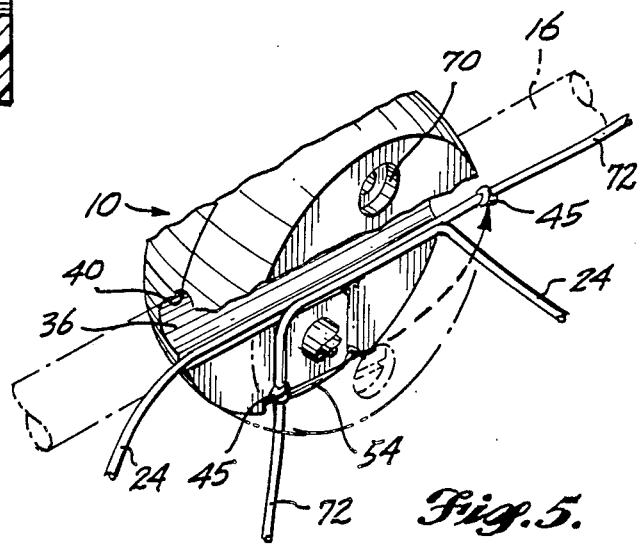

LINE CONNECTOR

TECHNICAL FIELD

The present invention relates to a connector for interconnecting two or more lines at locations intermediate the ends of at least one of the lines, and more particularly to a connector for quickly and securely interconnecting a fishing net along the length of one or more support lines.

BACKGROUD OF THE INVENTION

It is often necessary to interconnect together two or more lines at locations intermediate the ends of at least one of the lines. One example of such a need is to interconnect a fishing net at locations along the length of its support lines. For instance, gill net assemblies, known in the trade as "shackels," are composed of a length of netting or webbing having its upper edge portion tied to a float line. Corks or other type of flotation devices are attached to the float line for supporting the upper edge of a grill net. Typically, the upper margin of the gill net is tied to the float line with a series of twines that extend downwardly from the float line to interconnect with the upper margin of the net. The gill net shackle also includes a weight line having a plurality of weights, such as lead, attached thereto, with the weight line tied to the lower margin of the net with twines comparable to those used to tie the upper margin of the net to the float line. Examples of this type of gill net construction are shown in U.S. Pat. No. 3,545,120.

In the present application the term "support line" will be used to refer to either the float line, the weight line or similar lines used to support and/or control fishing nets. As will be appreciated, the float line and weight line cooperatively support the net as a vertical curtain in the water.

As is well known in the art, the netting portion of fishing nets, such as gill nets, are quickly worn out or damaged, often after only one or two day's use. Because of the high cost of the float and weight lines, when the netting is worn out the entire shackle cannot simply be discarded; rather, the old netting is removed from the float and weight lines and replaced. Heretofore this has been an extremely laborious and time-consuming, manual procedure. Because the fishing season for many types of fish is now limited by government regulations to a relatively short duration, frequently to only a few days, until now it has not been economically feasible for fisherman to replace the worn out or damaged netting of shackles. As a result, fisherman must purchase a sufficient number of shackles for the entire fishing season. However, in most fishing areas, by government regulations, the number of shackles that may be carried onboard a fishing vessel at any particular time is limited. As a result, fisherman typically must store extra shackles on shore. Then, when the nets onboard have worn out or become damaged, the boat must return to shore to off-load the old shackles and take on the new ones. As will be appreciated, valuable fishing time is lost during the trip(s) to and back from shore.

There is not, however, a limitation on the quantity of netting which can be kept onboard as long as it is not attached to the float and weight lines. Thus, it is theoretically possible to keep spare netting onboard and then replace the netting of assembled shackles as needed. However, as noted above, because of the slow, manual operation of attaching the netting to the float and weight lines, heretofore, this has not been a viable alternative to fisherman.

Accordingly, the present invention addresses the problem of quickly attaching together two or more lines at locations intermediate the ends of at least one of the lines, and particularly concerns a novel connector to quickly and simply attach fishing nets to support lines at spaced-apart locations along the lengths of the support lines and subsequently detach the nets from the lines.

Applicant in his prior U.S. Pat. No. 4,693,031 ('031 patent) has provided a line connector that partially solves the foregoing problem. In the '031 patent, the ends of short twines are tied to a support line in registry with corresponding short twines having their ends tied to the margins of the fishing net. A connector in the form of a body is constructed with the first cross hole extending through the body and a slit extending from the outer periphery of the body crosswise through a portion of the body to intersect the first cross hole along the length thereof. The intermediate portion of a support line twine is slid transversely through the slit into engagement within the first cross hole. A second cross hole extends through the body at an orientation generally transversely to the first cross hole to cross perpendicularly through the slit. A groove extends around the outer periphery of the body and intersects the two ends of the second cross hole. A net twine, doubled upon itself, is threadably engaged through the second cross hole and then looped around the body to seat within the groove extending around the periphery of the body thereby preventing the net twine from being detached from the body when the ends in the net twine are drawn taut. Also, since the net twine is positioned between the support line twine and the outer periphery of the slit, the net twine prevents the support line twine from being disengaged from the body. One drawback of the foregoing construction is that a connector is required at each net twine location requiring a large number of connectors.

SUMMARY OF THE INVENTION

In accordance with the present invention, a connector is provided for interconnecting two or more lines at locations intermediate the ends of at least one of the lines. The connector is composed of two separate, complementary, opposing members disposible in face-to-face relationship to each other. Each of the connector members has portions cooperatively defining a primary, through passageway extending through the connector at the interface of the two members for snug reception of the intermediate portion of a primary line. The two connector members also have portions that cooperatively define one or more secondary passageways that also extend through the connector at the interface of the two, connector members for receiving one or more secondary lines. The secondary passageways include a first section extending through the connector, preferably longitudinally of the primary passageway. The secondary passageways also preferably include transverse sections that extend transversely from the first sections of the secondary passagways to intersect with the exterior perimeter of the connector. The longitudinal sections of the secondary passageways are large enough in size to permit passage of the secondary lines when knotted upon themselves; however, the transverse sections of the secondary passageways are much smaller in size to closely correspond to the thickness of the secondary lines so that the knotted ends of secondary lines cannot pass through the secondary, transverse passageways.

By the foregoing construction, a secondary line may be engaged with the connector by threading the tail end of the secondary line (extending outwardly of the knot formed in the end portion of the secondary line) through the first, longitudinal section of a secondary passageway until the knot and the tail end extend all the way through the connector. Thereupon, the tail end of the secondary line is grasped and pulled toward the outer end of the adjacent secondary transverse passageway so that the inwardly adjacent portion of the connector line is slid (forced) across the adjacent face portions of the connector members to engage within the transverse section of the secondary passageway. Once the secondary line is within the transverse section of the secondary passageway, the secondary line cannot be disengaged from the connector because the knot formed in the end portion of the secondary line is too large to pass through the transverse section of the secondary passageway. The secondary line is detached from the connector by reversing the foregoing procedure.

In a further aspect of the present invention the two connector members are clamped in face-to-face relationship to each other, thereby to capture the primary line within the first passageway, by a post that extends transversely from the mating face of one connector member in the direction towards the opposite connector member to engage within an aligned socket formed in such opposite connector member. The post and socket are sized to provide an interference fit therebetween. In particular, the post is formed with an enlarged distal end portion of a size larger than the corresponding portion of the socket so that the distal end of the post must be compressed in size to slide through the socket. Preferably the enlarged distal end of the post extends beyond the interfering portion of the socket to bear against the end of the socket thereby to impart a compressive lug on the connector at the interface of the two connector members.

In a further aspect of the present invention, the connector of the present invention is adapted to interconnect a fishing net to one or more support lines. For this function, the connector preferably is generally round in shape to prevent the connector from snagging on the net or suspension lines, especially when the net is being reeled in or payed out from a powered drum. The support line is captured within the primary passageay of the connector by clamping the two connector members together. Connector lines are threaded through a series of net twines located along the margins of the net and then the opposite ends of the connector lines are detachably engaged with adjacent connectors in the manner described above. Alternatively, the ends of the connector lines can be engaged with the connector at the same time the two connector bodies are initially clamped together in which case the connector lines are simply layed within the longitudinal and transverse sections of the secondary passageway prior to the two connector members being clamped together. Once clamped together the connector lines are prevented from disengaging from the connector member because the knotted ends of the connector lines are too large to retract through the transverse sections of the secondary passageways.

To replace the netting, one end of a connector line is detached from a connector member and then removed from the net twines. Thereafter, the connector line is simply threaded through the net twines of the new net and reengaged with the connector member. The connector line is detached from the connector member by grasping the tail end of the connector line and swinging the adjacent length of the connector line along the interface of the two connector members toward the end of the longitudinal section of the secondary passageway until such adjacent length of the connector line is disposed within the larger, longitudinal section of the secondary passageway. Thereupon, the connector line may be removably pulled through the longitudinal section of the secondary passageway by simple tugging on an intermediate portion of the connector line. To reattach the end of the connector line with the connector, the tail end of the connector line is threaded through the longitudinal section of the secondary passageway until the knot and tail end extend beyond the opposite end of the passageway. Next, the tail end of the connector line is swung across the adjacent mating face portions of the connector members toward the outer end of the adjacent secondary, transverse passageway until the connector line is seated back within the transverse section of the secondary passageway. Thereupon, the connector line is prevented from disengaging from the connector member due to the larger size of the knot of the connector line relative to the size of the transverse section of the secondary passageway.

In accordance with an additional aspect of the present invention, projections extend inwardly into the interior of the primary passageway to prevent the support line from moving relative to the primary passageway.

BRIEF DESCRIPTION OF THE DRAWINGS

The details to typical embodiments of the present invention will be described in connection with the accompanying drawings, in which:

FIG. 3 is an enlarged isometric view of the present invention illustrating the connector of the present invention as assembled;

FIG. 4 is a greatly enlarged, fragmentary, cross-sectional view of the post and socket portions of the connector member shown in FIG. 3, taken substantially along lines FIG. 4—4 of FIG. 3; and, FIG. 5 is a fragmentary isometric view of the connector member shown in FIG. 3 illustrating the manner in which the connector lines are engaged with and disengaged from the connector member.

DETAILED DESCRIPTION

Figure 1:
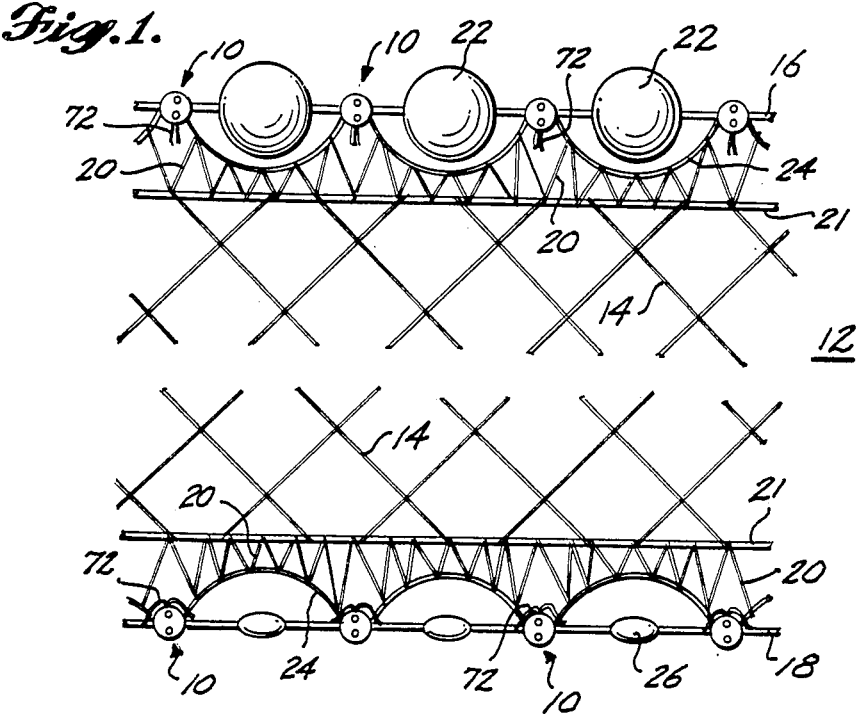
FIG. 1 is a partially schematic view illustrating a line connector constructed in accordance with the present invention employed to interconnect a fishing net with an overhead float line and a lower weight line.

Referring initially to FIG. 1, a plurality of connectors 10 constructed according to a preferred embodiment of the present invention are illustrated as being employed to a form a gill net assembly or shackle 12. The shackle 12 includes netting or webbing 14 supported as a vertical curtain in the water between an overhead float line 16 and an underlying weight line 18. The netting 14 is conventional in nature and can be composed of braided or monofilament nylon or other plastic or synthetic material. Alternatively, the net can be constructed from natural materials. As will be appreciated, the width and height of the netting, the size or gauge of the net openings, and the thickness or weight of the material used to construct the netting 14 are dependent upon various parameters, such as the type of fish being sought and the fishing technique being used, whether gill netting, trolling or purse seining.

The ends of net twines 20 are tied to salvage lines 21 extending along the upper and lower margins of the netting 14 to form spaced-apart loops. It will be appreciated that the net twines 20 can be constructed separately from the netting 14 and tied thereto, or alternatively can be formed as an integral part of the netting.

A plurality of floats 22 are spaced apart along the length of the float line 16 are are secured to the float line by any conventional method. The floats 22 may be composed of cork, foam or other suitable types of buoyant material. Relatively short connector lines 24 are utilized to extend through a series of adjacent net twines 20, with the ends of the connector lines quickly and conveniently detachably connected to the float line 16 by the connectors 10, as explained more fully below.

As noted above, a weight line 18 extends beneath and along the length of the lower edge portion or salvage of the netting 14. A plurality of weights 26, composed of lead or other suitable dense material, are spaced-apart along the length of the weight line. The weights 26 may be secured to the weight line 18 by any convenient method. As with the float line 16, connector lines 24 are strung through a series of adjacent net twines 20, with the ends of the connector lines being quickly and conveniently detachably connected to the weight line 18 by the connectors 10 of the present invention.

Figure 2:
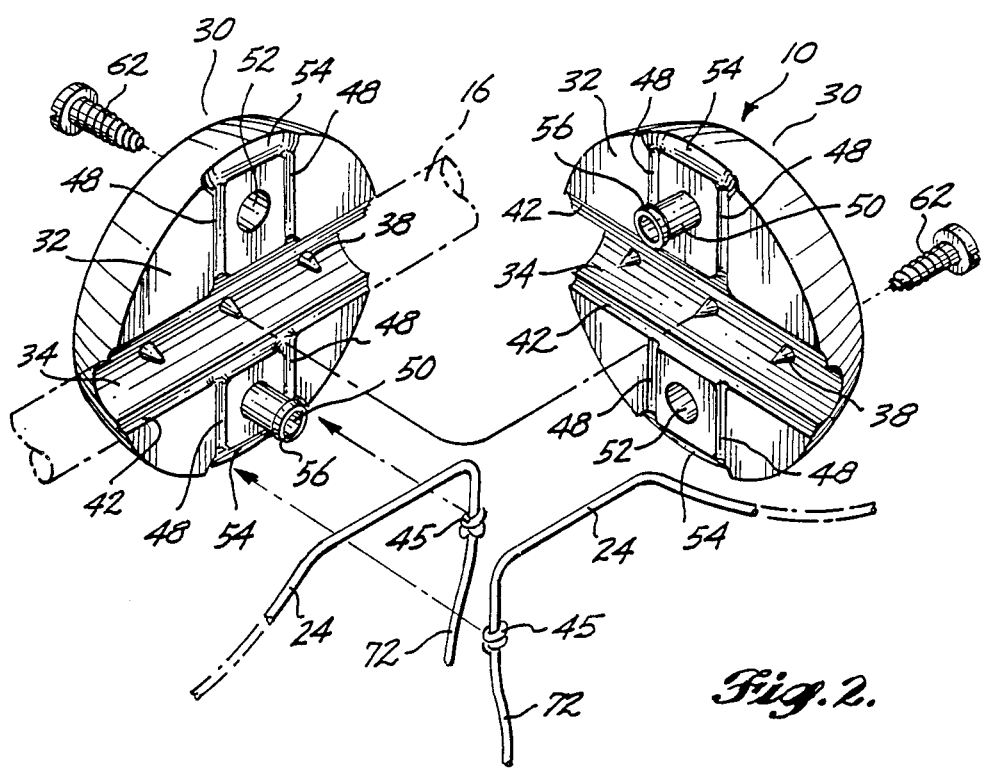
FIG. 2 is an enlarged isometric view of the connector of the present invention shown disassembled.

Next, more specifically considering the construction of connector 10, FIGS. 2, 3 and 5 illustrate the connector 10 as being employed to interconnect the upper salvage line 21 of the netting 14 to float line 16. It is to be understood that the connector 10 may be used to interconnect other types of lines which may or may not be associated with fishing nets. Nevertheless, as an illustrative, but not limiting example, the connectors 10 will be described in association with the gill net shown in FIG. 1, and more specifically as interconnecting the float line 16 to the netting 14. It is to be understood that the following description of the construction and use of the connector 10 also applies not only to the attachment of the weight line 18 to the netting 14, but also generally to the connection of two or more lines to each other.

As most clearly shown in FIGS. 2 and 3, connector 10 is composed of two complementary, opposing disk-shaped members 30 having inward faces 32 disposed in face-to-face relationship to each other when the connector members are assembled together as shown in FIG. 3. Although not essential, preferably faces 32 are generally planar. A primary groove 34 extends across the connector member faces 32 to cooperatively form a primary bore or passageway 36 extending through the connector 10. The primary passageway 36 is sized to snugly received the line 16 therein.

Although not essential, ideally the two connector members 30 composing connector 10 are identical in construction. To this end, ideally the primary grooves 34 extend centrally through the faces 32 so that the primary passageway 36 extends centrally through the connector 10. As discussed more fully below, other features of the connector members 30 are designed to enable the connector members to be identical in construction.

As illustrated in FIG. 2, spike or cone-shaped projections 38 extend inwardly from the surface of the primary grooves 34 into the interior of the passageway 36 to engage and embed within the support line 16, thereby to prevent movement of the support line relative to the connector 10. The number and size of the projections 38 may be varied depending upon various factors, such as the load imposed on the connector 10 during use, the size of the float line 16 and the material composition of the float line. It is to be understood that the function of projections 38 may be accomplished by other methods, such as by forming the primary grooves 34 with knurled or otherwise roughened surfaces.

The connector members 30 are illustrated in FIGS. 2 and 3 as being of a disk shape. This shape has the advantage that it is readily molded. Also, when the two connector members 30 are assembled the resulting connector 10 has a circular circumference to minimize the likelihood that the connector will "hang-up" on the netting 14 or the net twines 20 as the shackle 12 is reeled in onto a powered drum, as typically used during gill netting, or payed out from the drum when placing the shackle 12 at a desired location in the water. Nonetheless, the connector members 30 can be formed so that the connectors 10 are of other roundular shapes, such as oval or spherical.

Again, referring specifically to FIGS. 2 and 3, the connector members 30 are formed with a secondary passageway system 40 for receiving connector lines 24 therein. The secondary passageway system 40 are composed in part of longitudinal grooves 42 extending across the connector faces 32 to cooperatively form secondary, longitudinal passageways 44. Although not essentail, ideally the longitudinal grooves 42 are coextensive with the primary grooves 34 and extend across the connector member faces 32 at the locations at which the side edges of the primary grooves 34 intersect the connector member faces 32, thereby facilitating the manufacture of the connector members 30, such as through an injection molding process. The longitudinal grooves 42 are sized in cross section so that the secondary, longitudinal passageways 44 in cross section are sufficiently larger in cross section than the size of the connector lines 24 to permit knots 45 formed near the ends of the connector lines to freely pass through the longitudinal passageways 44, as will be discussed more fully below. It is to be understood that rather than being located contiguous with the primary passageway 36, the secondary, longitudinal passageways 44 may be spaced away from the primary passageway without departing from the spirit or scope of the present invention.

The secondary passageway systems also include a pair of spaced-apart passage-ways 46 that extend transversely from the longitudinal passageways 44 to intersect with the outer periphery of connector 10. As shown most clearly in FIG. 2, the secondary transverse passageways 46 are composed of transverse grooves 48 formed in connector member faces 32. Ideally, the transverse grooves 48 are located on opposite sides of posts 50 and corresponding sockets 52 used to assemble the connector members 30 together, as discussed more fully below. The transverse grooves 48 are sized in cross section so that the resulting secondary, transverse passageways 46 are only slightly larger than the crosssectional size of the connector lines 24 to allow the connector lines 24 within the transverse passageways 46 to slide longitudinally within the transverse passageways while preventing the knots 45 of the respective connector lines from passing through the transverse passageways. Ideally, an enlarged pocket 54 is formed at the intersection of the outer ends of the secondary, transverse passageways 46 with the outer circumference of the connector 10 to receive therein the knots 45 of the connector lines 24. As such, the knots 45 do not extend beyond the outer envelope defined by the connector 10 so that the knots do not interfere with or otherwise "hang-up" on the net twines 20 or the netting 14. Ideally, the pocket 54 extends along the outer circumference of the connector to interconnect the ends of both transverse passageways 46 to form a trough-like indentation in the connector. However, smaller, individual pockets could be formed at the intersection of each transverse passageway with the outer circumference of the connector.

Although it is not essential, ideally the longitudinal grooves 42 and the transverse grooves 48 are formed in both faces 32 of the connector members 30 so that each secondary, longitudinal groove 42 and secondary, transverse groove 48 forms substantially one-half of a longitudinal passageway 44 or a transverse passageway 46, respectively. However, it is to be understood that the longitudinal grooves 42 and transverse grooves 48 may be formed entirely within one connector face 32 while still enabling the two connector members 30 to be of identical construction. For instance, the longitudinal grooves 42 could be formed only along the side of the primary groove 34, adjacent a post 50, and not along the side of the primary groove adjacent a socket 52. Also, the transverse grooves 48 could be formed only in the portion of the connector face 32 adjacent post 50, and not in the portion of the connector face adjacent the socket 52.

As noted above, post 50 and sockets 52 are employed to detachably clamp the two connector members 30 together to form the connector 10. Referring specifically to FIG. 2, in each connector member 30 a post 50 extends transversely outwardly from face 32 at a location along one side of the primary groove 34 and a correspondingly sized and shaped socket 52 extends transversely through the connector member at a location along the opposite side of the primary groove. Preferably, the socket 52 extends entirely transversely through the connector. Also, preferably the clamping function of the post 50 and the socket 52 is accomplished by providing a snug or interference fit between the post and socket. To this end, ideally the distal end 56 of the post 50 is somewhat enlarged relative to the remainder of the post to a size larger than the diameter of the socket 52, at least in the portion of the socket corresponding to the post distal end 56. Also, ideally the enlarged distal end 56 of the post 50 extends somewhat beyond the end of the socket 52 and into a first counterbore 58, FIG. 4. By this construction, the enlarged, rounded end 56 of the post 50 is compressed as it is forced through the socket 52 and then returns to its nominal larger size once the end has engaged through the socket, thereby preventing the post from readily disengaging from the socket. Also, ideally the enlarged end 56 of the post 50 extends beyond the end of the socket 52 to bear against shoulder 60 of the counterbore 58, thereby to impose a clamping force on the two connector members 30 holding them in face-to-face relationship to each other. To facilitate the compression of the enlarged end 56 of the post 50, ideally the post is hollow in construction, at least at its enlarged end portion.

The pocket 54 extending between the outer ends of adjacent transverse passageways 46 defines a bevel that is sized to permit the edge of a knife, the end of a screwdriver, or other tool to be inserted therein to conveniently separate the two connector members when desired. However, as discussed more fully below, the two connector members need not be separated from each other when replacing netting 14.

To assist in maintaining the two connector member 30 in assembled relationship, for instance, if an extremely large load is imposed on the connector lines 24 or if post 50 is damaged, a fastener, such as a screw 62, may be engaged within the hollow interior of the post 50 and a corresponding bore 64 extending transversely through the connector member in alignment with the hollow interior of the post. Ideally, a second, larger counterbore 66 is formed outwardly adjacent the first counterbore 58 to receive the enlarged head portion of the screw 62 which bears against counterbore shoulder 68. The screw 62 can be of a selftapping type so that threads need not be performed within the hollow interior of post 50 nor within the aligned bore 64. An outer counterbore 70 ideally is also formed in alignment with bore 64 to receive a fastener member, such as a nut (not shown), so that screw 62 may be replaced with a small bolt or other type of hardware member.

Although each connector member 30 is illustrated in FIGS. 2 and 3 as composed of a single post 50 and a single socket 52 both generally laterally centered relative to the connector member, it is to be understood that additional posts and sockets may be employed without departing from the spirit or scope of the present ivention. The additional posts and sockets may be required if the connector 10 is constructed in a relatively large size and/or if the connector is subjected to relatively high loads.

In operation, to initially attach the netting 14 to the support line 16, connector members are assembled together at spaced-apart locations along the support line so that the support line is disposed within the primary grooves of the connectors thereby capturing the support line within the primary passageway 36 defined by the primary grooves. Thereafter, the free or tail end 72 of the connector line is threaded through the longitudinal passageway 44 of the connector located nearest the net until the knot 45 formed in the connector line extends beyond the end of the longitudinal groove. Thereupon, the tail 72 is pulled downwardly to slide the connector line between the connector member faces until the adjacent section of the connector line is positioned within the secondary, transverse passageway 46 located furthermost from the end of the longitudinal passageway that the connector line enters the connector, see FIG. 5. Because the secondary transverse passageway 46 is smaller in cross section size than knot 45, the connector line is prevented from disengaging from the connector. Next, the opposite end of the connector line is threaded through a desired number of net twines 20 and then of the tail end 72 of the line is threaded through the secondary, longitudinal passageway 44 of the next adjacent connector. Once the knot 45 of this end of the connector line extends beyond the end of the longitudinal passageway 44 the tail 72 of the connector line is manually grasped and then swung downwardly so that the portion of the connector line immediately inwardly of the knot 45 (on the opposite side of the knot from the tail 72) slides downwardly between the connector member faces 32 to place this inward section of the connector line within the nearer secondary, transverse passageway 46. By tugging on an intermediate location of the connector line 24, the knots 45 at each end portion thereof are seated within their corresponding pockets 54 so that the knots are located within the outer envelope of connector 10 while allowing the tails 72 to hand outwardly from the pockets. The tails 72 formed in the ends of the connector lines 24 need only be long enough to permit them to be conveniently manually grasped during engagement of the connector line with connector 10 and also the disengagement of the connector line from the connector.

It will be appreciated that the size of the secondary longitudinal passageways 44 are sufficiently large enough to permit the knot 54 of one connector line to readily slide therethrough while a second connector line 24 (entering the passageway from the opposite direction) is already disposed within the passageway, see FIG. 3 and 5.

As an alternative procedure, the netting 14 may be initially attached to the support line 16 by placing one connector member 30 against the support line 16 so that the support line is disposed within the primary groove 34 of the connector. Thereupon, the end portions of adjacent connector lines 24 are placed within a secondary longitudinal groove 42 and within a secondary transverse groove 48 located on the opposite side of the post 50 from which the connector line enters the secondary longitudinal groove so that the knot 45 extends beyond the end of the secondary transverse groove. Thereupon, the second connector member 30 is simply snapped into engagement with the first connector member thereby capturing the support line 16 within the primary passageway 36 and the connector lines 24 within the secondary passageway system 40. If the connector line 24 has been assembled with a knot 45 already within pocket 54, then no further steps are required. Because the secondary, transverse passageway 46 is smaller in size than the knot 45, the connector line 24 is prevented from disengaging from the connector.

The present invention may be employed to conveniently remove the netting 14 from the float line 16 and the weight line 18 to replace the netting, for instance, when damaged. This is accomplished by simply grasping the tail end 72 of connector line 24 and pulling on it slightly to remove knot 45 from pocket 54 and then swinging the connector line 24 between the connector member faces 32 until the portion of the connector line that was located within the secondary transverse passageway 46 (inwardly of knot 45) is now located within the secondary longitudinal passageway 44. Due to the relatively small size of the connector line 24, it is possible to force the connector line across the mating connector member faces without undue effort. Because the secondary longitudinal passageway 44 is larger in cross-sectional size than the size of knot 45, the line 24 together with its knot 45 may be now conveniently removed from the connector 10 even though there is another connector line (entering the longitudinal passageway from the opposite direction) in the longitudinal passageway. Once disengaged from the connector 10, the connector line 24 is unthreaded from the net twines 20 of the old, damaged net 40 and then immediately threaded through the net twines of a new net. Thereupon, the connector line 24 is reengaged with the connector 10 by threading the tail end 72 of connector line back through the secondary, longitudinal passageway 44. Once the knot 45 of the connector line 24 has been extended through the secondary longitudinal passageway 44, the tail 72 of the connector line may be conveniently grasped to swing (force) the inwardly adjacent portion of the connector line back across the connector member faces 32 to place the connector line back into the secondary transverse passageway 46. By tugging on an intermediate portion of the connector line 24, the knot 45 of the connector line is receded back into its pocket 54.

It will be appreciated that connector 10 may be used in substantially the same manner as described above even if secondary, transverse passageways 46 are not formed within the connector members 30. The need for the secondary, transverse passageways 46 diminishes as the size of the connector line 24 is decreased. If the transverse passageways 48 are not employed, it still would be desirable to employ pockets 54 to receive the knots 45 of the connector lines so that such knots are positioned within the envelope of the connector 10.

As will be apparent to those skilled in the art to which the invention is addressed, the present invention may be embodied in forms other than those specifically disclosed above without departing from the spirit or essential characteristics of the invention. The particular embodiments of connector 10, described above, are therefore to be considered in all respects as illustrative and not restrictive. The scope of the present invention is as set forth in the appended claims rather than being limited to the examples of connector 10 set forth in the foregoing description.

The embodiments of the invention in which an exclusive property or privilege is claimed are defined as follows:

1. A connector for detachably interconnecting at least two lines, comprising;
    two separate, complementary, opposing members disposible in face-to-face relationship to each other, said two members:
    having portions cooperatively defining a first through bore extending through the connector at the interface of the two members for snug reception of a primary line; and,
    having portions cooperatively defining passageway means extending through the connector at the interface of the two members for receiving at least one secondary line, said passageway means sized to enable the secondary line to readily slide lengthwise of the line through the secondary passageway means; and
    means for detachably clamping the two connector members together in face-to-face relationship thereby to snugly capture the primary line in the through bore.

2. The line connector according to claim 1, wherein the two opposing connector members are substantially identical in shape.

3. The line connector according to claim 2, wherein the two connector members are generally disk-shaped.

4. The line connector according to claim 1, further comprising means associated with the through bore for frictionally restraining the movement of the primary line.

5. The line connector according to claim 4, wherein the restraining means includes projections extending transversely from the connector members into the interior of the through bore.

6. The line connector according to claim 1, wherein the through bore extends substantially through the center of the connector.

7. The line connector according to claim 1, wherein the passageway means are composed of passageways extending along opposite sides of the through bore.

8. The line connector according to claim 7, wherein the passageways are composed to opposing grooves extending across the mating faces of the two connector members, said opposing grooves being in registry with each other when the connector members are clamped together.

9. The line connector according to claim 7, wherein the passageways are of sufficient size to permit the secondary line when knotted upon itself to pass therethrough.

10. The line connector according to claim 1, wherein the passageway means are composed of grooves disposed within the mating faces of the two connector members.

11. The line connector according to claim 10, wherein opposing grooves are disposed within the mating faces of the two connector members, said opposing grooves being in registry with each other when the connector members are clamped together.

12. The line connector according to claim 1, wherein the passageway means are substantially contiguous with the through bore.

13. The line connector according to claim 12, wherein the passageway means include a first passageway section extending along the through bore and a second passageway section extending substantially transversely to the first passageway section to extend from the first passageway section to the exterior perimeter of the connector.

14. The line connector according to claim 13, wherein the first passageway section extends the entire distance across the connector.

15. The line connector according to claim 14, wherein the first passageway section is of sufficient size to permit the secondary line when knotted upon itself to pass therethrough, and the second passageway section is of a size to prevent the secondary line when knotted upon itself to pass therethrough.

16. The line connector according to claim 13, further including a pocket formed at the intersection of the second passageway section and the exterior perimeter of the connector for receiving the knotted end of the secondary line.

17. The line connector according to claim 1, wherein the ends of the passageway means:
intersect the outer perimeter of the connector body at distal locations from each other; and,
being enlarged at their intersection with the exterior perimeter of the connector to receive the knotted end of a secondary line therein.

18. The line connector according to claim 1, wherein the passageway means include two passageways, each extending along opposite sides of the through bore at the interface of the two connector members.

19. The line connector according to claim 18, wherein the two passageways extend substantially contiguous with the through bore.

20. The line connector according to claim 18, wherein the two passageways including a first section extending along the through bore and a second section extending transversely to the first section to intersect with the exterior perimeter of the line connector.

21. The line connector according to claim 20, wherein the first sections of the passageways are of sufficient size to permit the secondary line when knotted upon itself to pass therethrough, and the second sections of the passageways are of a size to prevent the secondary line when knotted upon itself to pass therethrough.

22. The line connector according to claim 21, wherein the second sections of the passageways at their intersections with the exterior perimeter of the line connector are enlarged to receive the knotted ends of the secondary lines therein.

23. The line connector according to claim 1, wherein said clamping means, comprising:
(a) at least one post extending transversly from the mating face of a connector member in the direction towards the opposite connector member;
(b) a socket in the opposite connector member in registry with the post for reception of the post; and,
(c) wherein the post and the socket are sized to provide an interference fit therebetween.

24. The line connector according to claim 23, wherein the post has an enlarged distal end portion of a size larger than the corresponding portion of the socket, the enlarged end portion of the post extending beyond the interfering portion of the socket to bear against the end of the socket thereby to impart a compressive load on the line connector at the interface of the two connector members.

25. The line connector according to claim 24, wherein the post is hollow.

26. The line connector according to claim 25, wherein a counterbore formed at the end of the socket opposite the mating face of the connector member, said counterbore being of a size larger across than the maximum distance across the distal end of the post to received the enlarged end of the post.

27. A connector for attaching a fishing net to a support line, with the net including a plurality of spaced apart net twines attached to the adjacent edge portion of the net to form net twine loops for receiving a connector line through the loops of adjacent net twines, the connector comprising:
(a) two separate, substantially identical, opposing members having complementary mating faces, the two connector members having portions defining opposing primary grooves extending across the mating faces, the primary groove cooperatively defining a first passageway extending through the connector at the interface of the two members to snugly receive the support line therein;
(b) a post extending transversely from the mating face of each connector member to engage within an aligned socket formed in the opposite connector member;
(c) the two opposing connector members having portions cooperatively defining a pair of second passageways extending through the connector at the interface of the two members, said second passageways sized to slidably receive at least one connector line therein; and,
(d) means for detachably clamping the two connector members together in face-to-face relationship to snugly capture the support line within the first passageway while allowing longitudinal movement of the connector line within the second passageways.

28. The fishing line connector according to claim 27, wherein the two connector members are generally disk-shaped.

29. The fishing net connector according to claim 28, wherein the first passageway extends through substantially the center of the connector member.

30. The fishing net connector according to claim 29, wherein the second passageways are substantially contiguous with opposite sides of the first passageway.

31. The fishing net connector according to claim 30, wherein the second passageways include secondary grooves formed in each connector member contiguous with the primary groove.

32. The fishing net connector according to claim 27, wherein the second passageways include a longitudinal section extending generally along the first passageway and a transverse section extending generally transversely to the longitudinal section to extend from the longitudinal section to the exterior perimeter of the fishing net connector.

33. The fishing net connector according to claim 32, wherein the longitudinal sections of the second passageways are of sufficient size to permit the connector lines when knotted upon themselves to pass therethrough, and the transverse sections of the second passageways are sized to prevent the connector line when knotted upon itself to pass therethrough.

34. The fishing net connector according to claim 32, wherein the second passageways include two transverse sections, both extending from the longitudinal section to intersect with the exterior of the fishing net connector.

35. The fishing net connector according to claim 34, wherein the two transverse sections are located on opposite sides of a post.

36. The fishing net connector according to claim 32, wherein the transverse section of the second passageways are composed of opposing grooves formed in the mating faces of both connector members.

37. The fishing net connector according to claim 32, wherein an enlarged pocket is formed at the intersection of the transverse section of the second passageway with the exterior perimeter of the fishing net connector to receive the knotted end of a connector line.

38. The fishing net connector according to claim 37, wherein the connector line includes a short tail section extending beyond the knot formed in the connector line, the tail section extending out of the pocket.

39. The fishing net connector according to claim 27, further comprising means associated with the first passageway to frictionally resist the movement of the support line within the first passageway.

40. The fishing net connector according to claim 39, wherein the friction means include projections extending into the first passageway to impinge against the support line.

41. The fishing net connector according to claim 27, wherein the clamping means include the post and socket.

42. The fishing net connector according to claim 41, wherein the post has an enlarged distal end of size nominally slightly larger than the corresponding end of the socket, the enlarged end of the post extending beyond the corresponding end of the socket when the connector members are clamped together in face-to-face relationship whereby the distal end of the post is permitted to assume its nominal, enlarged size thereby bearing against the adjacent end of the socket to impose a clamping force on the connector members at their interface.

43. The fishing net connector according to claim 42, wherein the post is hollow.

44. The fishing net connector according to claim 43, wherein a first counterbore is formed in the connector member at the end of the socket to receive the enlarged, distal end of the post.

45. The fishing net connector according to claim 44, wherein a second counterbore is formed in the connector member adjacent the first counterbore to receive an enlarged portion of a hardware member extending through the first counterbore and into the hollow interior of the post, said hardware member engaging within the hollow interior of the post to serve as auxiliary clamping means to clamp the two connector members together in face-to-face relationship with each other.

* * * * *